UNITED STATES PATENT OFFICE.

EMILY ROBERTS LEWIS, OF PHILADELPHIA, PENNSYLVANIA.

PROCESS FOR THE PRODUCTION OF CYANOGEN COMPOUNDS.

1,321,459.  Specification of Letters Patent.  Patented Nov. 11, 1919.

No Drawing.  Application filed March 15, 1919. Serial No. 282,779.

*To all whom it may concern:*

Be it known that I, EMILY ROBERTS LEWIS, a citizen of the United States, and a resident of the city and county of Philadelphia, State of Pennsylvania, have invented a certain new and useful Process for the Production of Cyanogen Compounds, of which the following is a specification.

My invention relates more particularly to that class wherein cyanogen compounds are produced through the combination of atmospheric nitrogen with a metal or salt of the alkali metal or alkaline earth metal such as sodium, potassium, barium, etc., carbon, iron and an inactive substance, such as chalk, talc, mica, etc., and in which the solid materials are preferably finely ground and intimately mixed in such proportions and so disposed as to produce a nonadhesive extended surface capable of rapidly absorbing nitrogen, when necessary heat conditions are maintained.

An examination of the art shows that the most difficult points to be overcome in order to attain a commercially successful process for the production of cyanogen compounds, from atmospheric nitrogen and powdered solid reaction materials, are the necessity of operating at high temperatures, the time required to obtain such temperatures and the adhesive quality of the powdered material under such temperature conditions.

My process eliminates all of these objections by the utilization of a much larger quantity of a catalytic material, such as iron, etc., thereby greatly lowering the temperature of combination and in supplying an inactive substance, such as chalk, talc, mica, etc., in sufficient quantities whereby the alkali metal or salt present is prevented from flooding the reaction surface.

Bucher in his various United States patents has shown that the absorption process for the production of cyanogen compounds is not only well known but commercially practicable if the reaction materials can be handled both economically and rapidly. He preferably utilizes a mixture consisting of approximately 2 parts of iron, 2 parts of carbon and 1 part of an alkali metal or salt, while Morgan in his United States Patent No. 1,278,493, production of cyanogen compounds, utilizes a mixture of 1 part soda ash, or sodium carbonate ($Na_2CO_3$), 3 parts powdered iron and 3 parts of a carbonaceous substance, such as charcoal or coke and takes advantage of its adhesive qualities, when heated, to cause the materials to adhere to the inner surface of the reaction chamber.

I, however, have found that if the powdered iron, or similar catalytic material, is greatly increased in proportion to the rest of the charge the catalytic effect is materially increased and if a sufficient quantity of an inactive material, such as chalk, talc, mica, etc., is intimately mixed therewith the alkali metal or salt will be prevented from flooding the reaction surface, thereby causing the charge to remain dry and preventing it from adhering to the walls of the reaction chamber.

In my process I preferably make use of 1 part of an alkali salt or metal such as sodium, potassium, etc., 3 to 4 parts of carbon or carbonaceous material, 2 or more parts of an inactive substance, such as chalk, talc, mica, etc., and 4 to 8 parts of iron or like catalytic agent. All the materials are preferably finely powdered and intimately mixed, so that the alkali metal present is enabled to form a thin coating on the other ingredients thus presenting an extended solution surface for contact with the nitrogen, which may be free or admixed with carbon oxids.

By increasing the catalytic material I am enabled to operate at relatively lower temperatures, consequently the wear and tear of the apparatus is greatly reduced, while the chalk, or similar inactive material, keeps the particles of alkali salt or metal so well distributed as to effectively prevent the powdered material becoming viscid, thereby causing it to remain in a pulverulent state when heated.

By adhering to about the above proportions and maintaining the solid materials, to be treated, at the proper temperature in a suitable converter or reaction chamber, it will be found that the time necessary to effect the reaction will be limited only by the time required to admit the requisite quantity of nitrogen thereto.

Having thus specified and described the same, I claim as novel and my invention:

1. The hereinabove described process for the production of cyanogen compounds from nitrogen, an alkali metal, carbon, iron and an inert non-alkaline mineral which includes the pulverizing and mixing of the solid materials and charging same into a suitably heated converter or reaction chamber in such proportion as to supply sufficient carbon for the reaction with the alkali metal present, sufficient inert non-alkaline mineral to prevent the pulverulent mass becoming viscid and sufficient iron to effectively reduce the temperature of combination of the active participants in the reaction, when brought into contact with heated nitrogen in a suitably heated converter or reaction chamber, to form a cyanogen compound therefrom.

2. The hereinabove described process for the production of cyanogen compounds from nitrogen, a salt yielding an alkali metal on reduction, carbon, iron and an inert non-alkaline mineral, which includes the pulverizing, mixing and charging of the solid materials into a suitably heated converter or reaction chamber in the proportion of 1 part of a salt yielding an alkaline metal on reduction, 3 to 4 parts carbon, 2 or more parts of an inert non-alkaline mineral, 4 to 8 parts of iron and sufficient nitrogen to form a cyanogen compound therefrom.

E. ROBERTS LEWIS.